United States Patent Office 3,299,005
Patented Jan. 17, 1967

3,299,005
OXYMETHYLENE-EPSILON CAPROLACTAM CO-POLYMERS AND METHOD OF PREPARATION
Kornel D. Kiss, University Heights, Ohio, assignor to Diamond Alkali Company, Cleveland, Ohio, a corporation of Delaware
No Drawing. Filed June 3, 1963, Ser. No. 284,823
11 Claims. (Cl. 260—67.5)

This invention relates to novel thermoplastic compositions having a high degree of thermal stability. More particularly, it relates to copolymers containing oxymethylene units in combination with units derived from ε-caprolactam.

In recent years oxymethylene polymers have become well known in the art. They may be prepared by polymerizing under substantially anhydrous conditions either formaldehyde, trioxane, which is a cyclic trimer of formaldehyde, or other oligomers of formaldehyde. These poylmers are thermoplastic materials of varying molecular weight composed of repeating oxymethylene —CH$_2$O— units joined together in linear chains which may be terminated at one or at both ends by thermally unstable hydroxyl groups, depending upon the method of preparation. Such oxymethylene polymers will be degraded or decomposed in varying degrees when exposed to elevated temperatures which are encountered during processing. To minimize degradation, these materials, prior to processing, are usually further treated such as by chain end-group capping, i.e., by converting the unstable hydroxyl groups to more stable ester or ether groups, and/or by incorporating therewith, stabilizing additives which will inhibit markedly polymer degradation.

It is an object of this invention, therefore, to provide a polymeric composition structurally related to polyoxymethylene which satisfactorily may be processed as prepared without first being further treated to stabilize it against degradation.

It is another object to provide a polymer composition having a high degree of thermal stability which suitably may be employed to prepare tough and durable plastic articles such as films, moldings, extrusions and the like.

It is still another object to provide tough and durable plastic articles, such as described above, from an oxymethylene copolymer composition having a high degree of thermal stability.

These and other objects of this invention will become apparent to those skilled in the art by the description of the invention which follows.

In general, the present invention comprises preparing a novel polymeric composition by polymerizing under substantially anhydrous conditions and in the presence of an ionic-type polymerization catalyst either formaldehyde or trioxane with 2-oxohexamethylenimine, more commonly desiganted in the art as ε-caprolactam, which has the cyclic structure

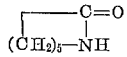

The copolymer products obtained are solid, medium to high molecular weight materials comprised of —CH$_2$O— monomer units and units having the structure

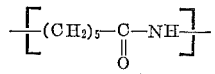

These copolymers exhibit a high degree of thermal stability, being not subject to substantial weight reduction when exposed to elevated processing temperatures, contrary to the significant or complete decomposition evidenced by unstabilized oxymethylene homopolymers at these same temperatures. Thus, the copolymers of this invention may be processed at required elevated temperatures without first being stabilized as by "capping" of their end groups and/or by the use of stabilizing additives therewith, and the useful plastic articles prepared therefrom are tough, opaque and chemically resistant.

In addition to the thermal stability of the copolymers as observed during processing operations and which will be described hereinafter by specific examples, the thermal stability of these materials is likewise determined by thermogravimetric analysis, i.e., by measuring the constant rate at which they will degrade at an elevated temperature at which degradation can be easily and accurately measured. This method, as generally practiced, is well known in the art and as employed herein involves heating in an inert atmosphere a prescribed quantity of the copolymer in an oven maintained at 220° C., measuring and recording the weight loss or degradation of the copolymer at intervals during the heat exposure period, and then plotting the logarithm of the weight percent of the remaining undegraded copolymer versus the corresponding times of oven exposure. A decomposition curve drawn through the plotted values indicates that the copolymer degrades initially at a very fast rate after which it degrades at a drastically lower or insignificant rate through a major portion of the degradation period, which latter period characterizes the true nature of the copolymer. The copolymers of this invention as prepared and without any further stabilizing treatment exhibit, when tested under these conditions, a reaction rate constant for thermal degradation of about 1 percent per minute or less, which value is selected from that portion of the degradation curve which represents the weight loss of the polymer after the initial decomposition is completed.

In the copolymerization reaction for preparing the copolymers of this invention, it is believed that the opening of the ε-caprolactam ring is brought about by breaking of the bond between the nitrogen and the adjacent carbon. The linear ε-caprolactam units resulting are then incorporated along with the oxymethylene monomer units in the growing polymeric chain and the copolymer product obtained contains recurring oxymethylene groups and ε-caprolactam groups having the structure as defined above. These ε-caprolactam units may be randomly distributed within the polymer chain and/or also may be present therein as comonomer blocks, i.e., segments of the polymer chain comprising at least two of the ε-caprolactam units sequentially joined together with no oxymethylene unit between them.

The copolymer products of this invention may contain generally from about 0.1 percent, by weight, up to about 50 percent, by weight, of the ε-caprolactam groups, which percentage is determined by elemental nitrogen analysis of the copolymers. That is to say, these copolymers may contain from about 0.03 up to about 21 mole percent of the ε-caprolactam groups or, as expressed in still another manner, a copolymer of this invention may contain in its polymeric chain from about 0.03 up to about 21 percent of recurring ε-caprolactam units and from about 79 up to 99.97 percent of recurring oxymethylene units. However, the preferred copolymers contain from about 90 up to about 99.92 percent of oxymethylene recurring units and from about 0.08 up to about 10 percent of recurring ε-caprolactam units, i.e., from about 0.08 up to about 10 mole percent of ε-caprolactam groups, or from at least 0.3 percent up to about 30 percent of said groups, by weight.

As described previously, the copolymers of this invention are medium to high molecular weight materials. In order to produce finished plastic articles having useful property levels these polymers usually have an inherent viscosity of at least 1, which value is determined by measuring at 60° C., a 0.5 percent solution of the copolymer in p-chlorophenol containing 2 percent, by weight, of a-pinene. An inherent viscosity value of 1 corresponds to an average polymer molecular weight of approximately 15,000. Copolymers from which products having the most useful property levels are prepared have usually an inherent viscosity of at least 1.2, which value corresponds to an average polymer molecular weight of about 30,000.

Depending upon the percentage of ε-caprolactam present in the copolymer product of this invention, these materials have melting points within the range of about 140° up to 180° C. They resemble oxymethylene homopolymers in appearance and those products having melting points similar to polyoxymethylene likewise exhibit similar properties.

As described previously, the novel copolymers of this invention exhibit, in contrast to unstabilized polyoxymethylenes, sufficient stability at elevated processing temperatures that they may be processed as prepared without being further treated, e.g., as by hydroxyl end-group "capping" and/or by physical admixture with additives to prevent, or greatly inhibit, thermal degradation. However, these copolymers may be further stabilized, e.g., by incorporating ester or ether groups at the end of any polymer chain which terminates with an oxymethylene unit, or by using stabilizing additives therewith, especially if the copolymer is to be exposed to elevated processing temperatures for excessively long periods of time.

The copolymerization is effected in the presence of an ionic-type polymerization catalyst. Suitable compounds of this type include Lewis acids, e.g. metal halides, such as the halides of boron, aluminum, tin, antimony and the like, and acyl halides, such as acetyl chloride, benzoyl chloride and the like; organometallic catalysts such as butyl lithium, diethyl zinc, triethyl aluminum, tributyl boron, phenyl magnesium bromide, methyl aluminum dichloride and the like; and coordinate complexes of metal halides, e.g., boron trifluoride with organic compounds in which sulfur and particularly oxygen or nitrogen is the donor atom. Metal halide catalysts or their coordinate complexes are preferably employed when preparing copolymers from trioxane. In general, the catalysts may be used in an amount ranging from 0.001 to 10 percent, by weight of the total monomer charge. However, an amount within the range of about 0.005 to 1 percent, by weight of the monomer charge, is preferably employed.

The reaction may be conducted in any anhydrous organic solvent for the monomer which is inert to the comonomers and to the catalyst and which has a melting point lower than the reaction temperature. Aliphatic, cycloaliphatic and aromatic hydrocarbons or their halogenated or nitro derivatives are generally employed, with aliphatic, cycloaliphatic and aromatic hydrocarbons containing from 3 to about 12 carbon atoms per molecule, e.g., n-heptane, cyclohexane or toluene, being especially preferred.

It is preferable that the copolymerization process be conducted under anhydrous or substantially anhydrous conditions. Therefore, the catalyst solution employed is prepared and then maintained prior to use in a nitrogen atmosphere, the liquid reaction medium is dried prior to use and the process is carried out entirely under nitrogen.

In carrying out the reaction, temperatures ranging from about −80° C. to about +100° C. and reaction times of about 1 to 6 hours may generally be employed. Preferably, the reaction is conducted at a temperature ranging from −70° to +60° C. and for a time period of from 2 to 4 hours. The copolymer products of this invention may be used to prepare articles such as moldings, films, sheets, rods, tubes, fibers, filaments and the like by molding and/or extrusion processes such as are practiced at the present time. In processing, the co-polymers may be used alone or may be modified with additives such as antioxidants, fillers, pigments, stabilizers, processing aids and the like.

In order that those skilled in the art may more completely understand the present invention and the preferred methods by which the same may be carried into effect, the following specific examples may be offered.

*Example 1*

A one-liter, three-necked polymerization flask is fitted with an agitator, a thermometer well, a reflux condenser, a rubber serum cap for catalyst injection and with inlet and outlet tubes for passage of nitrogen and formaldehyde vapors. A one-liter, three-necked flask used as a pyrolyzer to supply formaldehyde monomer to the polymerizer is fitted with a thermometer well and with gas inlet and outlet tubes, and is electrically heated. It is connected to the polymerization flask by means of a U-tube, 1 inch in diameter and about 10 inches long, which is positioned in a Dewar flask. Before assembly, the equipment is cleaned and dried at an elevated temperature. It is then maintained at a temperature above 100° C. until used, being assembled while hot. One hundred grams of trioxymethylene, reagent grade, is charged to the pyrolyzer, 250 ml. (approximately 218 g.) of dry toluene is charged into the polymerization flask and agitation is started. Nitrogen is passed through the system and is continued at a low flow rate throughout the reaction to provide an oxygen-free atmosphere. About 15 minutes after nitrogen purging is initiated, 2 grams of ε-caprolactam is added to the polymerizer and is dissolved in the toluene. Two ml. of a 1-molar solution of n-butyl lithium in n-heptane is then injected into the reaction mixture after which the mixture is then agitated for at least 30 minutes before being cooled to −70° C. by means of a Dry Ice-acetone cooling bath. The pyrolyzer is heated to 140° C. and the formaldehyde vapors formed are passed through the U-trap (maintained at a temperature below 0° C.) and introduced at a uniform continuous rate to the polymerizer above the surface of the agitated reaction mixture.

The reaction temperature is maintained at −70° C. for two hours after which the cooling bath is removed. The reaction mixture is then warmed by gentle heating to a temperature of about +70° C. for an hour, during which time formaldehyde generation is continued. The monomer generator is then shut down and the reaction mixture is cooled to room temperature before nitrogen purging is discontinued. The mixture is discharged from the polymerizer and filtered to recover the precipitated product which is then washed well with n-heptane and dried at 50° C., under vacuum. Twenty and eight-tenths g. of a fine white fibrous polymer is obtained. Chemical analysis shows the product to contain 0.8 percent nitrogen, which value corresponds to an ε-caprolactam content of about 6.4 percent by weight. The copolymer has an inherent viscosity of 1.28 as determined by measuring at 60° C. a 0.5-percent solution of the copolymer in p-chlorophenol containing 2 percent by weight of a-pinene. As determined in a Fisher-Johns melting point apparatus, the copolymer melts at approximately 170° C. and exhibits substantial stability up to at least 200° C. It has a reaction rate constant of thermal degradation at 220° C. ($k_{220°\ C.}$) of 0.07 percent per minute, when tested as described hereinabove. The copolymer is molded in a plunger-type molding press for 1 minute at 170° C. under a pressure of 4,000 lbs./sq. in. The molded white specimen obtained contains no bubbles, discoloration or other evidence of thermal degradation.

*Example 2*

A formaldehyde-ε-caprolactam copolymer is prepared employing the general procedure and polymerization recipe as outlined in Example 1, with the exception that 500 ml. (342 g.) of n-heptane is used as the liquid reaction medium and 2 ml. of a 1-molar solution of aluminum trichloride in nitrobenzene is employed as the catalyst. In this example, after adding the ε-caprolactam to the polymerization flask the reaction mixture is warmed to dissolve this material. The catalyst solution is injected into the mixture which is then maintained at 33°–35° C. for 30 minutes before formaldehyde vapor is introduced. After formaldehyde generation is initiated, the reaction is conducted for a period of 2½ hours, during which time the temperature of the reaction is raised gradually to 60° C. Twelve and two-tenths grams of a fine white copolymer is recovered, which begins to soften at 145° C. and melts at 155° C. Tough, white molded specimens are obtained by molding at 170° C. the copolymer product of this example as outlined in Example 1.

*Example 3*

In this example a formaldehyde-ε-caprolactam copolymer is prepared following the general procedure as outlined in Example 1, employing 500 ml. of n-heptane as the solvent medium, formaldehyde monomer which is generated by pyrolyzing trioxymethylene, 2 grams of ε-caprolactam and 2 ml. of a 1-molar solution of aluminum triethyl in n-heptane. The solvent medium is heated to 43° C. to dissolve the ε-caprolactam. The reactor is then cooled to room temperature and the catalyst reagent is injected. After formaldehyde generation is initiated, the reaction is conducted for approximately 4 hours. During this time the temperature of the mixture is gradually raised to 62° C. The reaction mixture is then cooled to room temperature while nitrogen purging is continued. It is then discharged from the polymerization flask and the precipitated product is separated, washed and dried. Twenty-two and eight-tenths g. of a fine, white copolymer is obtained which contains 3.5 percent nitrogen or 9.37 mole percent of ε-caprolactam. This product melts at 155° C. When molded at 170° C., as described in the previous examples, the copolymer is converted to a tough, white molded specimen.

It is to be understood that although the invention has been described with specific reference to particular embodiments thereof it is not to be so limited since changes and alternations therein may be made which are within the full intended scope of this invention as defined by the appended claims.

What is claimed is:

1. A linear, thermoplastic copolymer composition having a high degree of thermal stability consisting essentially of recurring oxymethylene groups and recurring groups derived from ε-caprolactam which have the structure

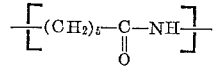

said copolymer composition containing from about 79 to 99.97 percent of recurring oxymethylene units and from about 0.03 up to about 21 percent of recurring ε-caprolactam units, the said ε-caprolactam units being incorporated in the copolymer during the preparation thereof by the opening of the ε-caprolactam ring.

2. The copolymer composition of claim 1 having an inherent viscosity of at least 1 and which contains from about 90 to about 99.92 percent of oxymethylene recurring units and from about 0.08 to about 10 percent of ε-caprolactam recurring units.

3. A process for preparing a copolymer composition having a high degree of thermal stability which comprises copolymerizing in an inert organic liquid reaction medium under substantially anhydrous conditions, at a temperature within the range of −80° C. to +100° C., for a time period of 1 to 6 hours and in the presence of a polymerization catalyst selected from the group consisting of organometallics, Lewis acids and coordinate complexes of metal halides with organic compounds in which the donor atom is a member of the group consisting of oxygen, nitrogen and sulfur, a compound selected from the group consisting of formaldehyde and trioxane with from about 0.03 up to about 21 mole percent of ε-caprolactam; and recovering a solid copolymer containing recurring units of oxymethylene and ε-caprolactam.

4. The process of claim 3 in which the catalyst is butyl lithium employed in an amount ranging between 0.001 to 10 percent, by weight of the total monomer charge.

5. The process of claim 3 in which the catalyst is aluminum trichloride employed in an amount ranging between 0.001 to 10 percent, by weight of the total monomer charge.

6. The process of claim 3 in which the catalyst is triethyl aluminum employed in an amount ranging between 0.001 to 10 percent, by weight of the total monomer charge.

7. A process for preparing a copolymer composition having a high degree of thermal stability which comprises copolymerizing in an inert organic liquid reaction medium under substantially anhydrous conditions, at a temperature within the range of −70° C. to +60° C., for a time period of 1 to 6 hours, and in the presence of between 0.005 to 1 percent, based on the weight of the monomer, of a polymerization catalyst selected from the group consisting of organometallics, Lewis acids and coordinate complexes of metal halides with organic compounds in which the donor atom is a member of the group consisting of oxygen, nitrogen and sulfur, formaldehyde with from about 0.03 to about 21 mole percent of ε-caprolactam; and recovering a solid copolymer containing recurring units of oxymethylene and ε-caprolactam.

8. The process of claim 7 in which the catalyst is butyl lithium.

9. The process of claim 7 in which the catalyst is triethyl aluminum.

10. A molded article prepared from the composition of claim 1 which exhibits substantially no thermal degradation.

11. An extruded article prepared from the composition of claim 1 which exhibits substantially no thermal degradation.

References Cited by the Examiner

UNITED STATES PATENTS

| | | | |
|---|---|---|---|
| 2,288,279 | 6/1942 | Hopff et al. | 260—72 |
| 3,026,299 | 3/1962 | Kray et al. | 260—67 |
| 3,161,617 | 12/1964 | Kritzler | 260—67 |
| 3,194,790 | 7/1965 | Brown | 260—67.5 |

OTHER REFERENCES

Formaldehyde, J. F. Walker, 1964, pages 187–191 and page 202.

WILLIAM H. SHORT, *Primary Examiner.*

H. SCHAIN, *Assistant Examiner.*